Jan. 18, 1966 G. T. HEMMETER 3,229,528
WHEEL BALANCER

Filed April 22, 1963 2 Sheets-Sheet 2

INVENTOR.
GEORGE T. HEMMETER
BY
Carlsen, Carlsen & Sturm
ATTORNEYS

United States Patent Office 3,229,528
Patented Jan. 18, 1966

3,229,528
WHEEL BALANCER
George T. Hemmeter, c/o Hemmeter Div., P.O. Box 158,
Mountain View, Calif.
Filed Apr. 22, 1963, Ser. No. 274,743
1 Claim. (Cl. 73—484)

This invention relates generally to wheel balancers and is more particularly concerned with wheel balancers of the type wherein a wheel and tire assembly is journaled on a substantially frictionless bearing and a static balancing of the wheel and tire assembly is effected whereby the axis of the same will assume a vertical position with respect to a horizontal plane to indicate that the wheel and tire assembly is statically balanced and will be stable under normal conditions of dynamic operation.

The present invention may be utilized with, for example, the apparatus shown and described in my copending application Serial No. 81,422, filed January 9, 1961, for Wheel Balancer. Reference is made to such copending application for a detailed consideration of the operation and characteristics of apparatus with which my present invention may be utilized.

From a consideration of the appended drawing and following specification and the matter shown and described in the above noted copending application for United States Letters Patent, it may be seen that an air or fluid lubricated spherical bearing arrangement is useful for providing a substantially friction free support of a wheel and tire and mounting assemblies therefor whereby the necessary measurements and balancing operations may be performed on such wheel and tire assembly. In my copending application and other prior art devices of this general type, the most widespread use has been in individual service stations, each of which is normally provided with a source of fluid, or air, under pressure which is utilized as a fluid for lubricating a bearing member. For reasons of economy, and others, it is undesirable to provide a constant supply of fluid under pressure to continuously lubricate a bearing when the apparatus is not in actual use for balancing a wheel and tire assembly. On the other hand, for the convenience of the operator and to provide suitable protection from inadvertent damaging contact between the respective spherical bearing surfaces under a heavy impact load, as for instance during engagement of a wheel and tire assembly, it is desirable to provide a means for preventing such contact between the bearing surfaces. One expedient which might be operative would be a simple mechanical stop which would releasably engage and hold the bearing members apart until such time as an adequate supply of fluid was supplied to the intervening space between the bearing members. However, as a consideration of the present invention will show, it is preferable to provide an automatic means for supplying fluid under pressure to the bearing surfaces which is responsive to a load, upon the bearings, which is of a magnitude less than that which will cause harmful contact between the bearing surfaces and which will remain in a fluid transmitting position continuously during such time as the load exceeds the predetermined minimum value.

It is therefore an object of the present invention to provide an improved means for supplying lubricating fluid to a spherical bearing in a static wheel balancer.

Another object of this invention is to provide an automatic valve for use in a wheel balancer of the type wherein a spherical bearing is lubricated with a fluid lubricant to provide substantially friction free support of a wheel to be balanced.

A still further object of the present invention is to provide wheel balancing apparatus wherein a fluid lubricated spherical bearing is automatically protected from damage due to the imposition of heavy loads thereon.

Another object of the present invention is to provide wheel balanciing apparatus which may be easily operated by an untrained user and which consumes air only when in use.

These and other more detailed and specific objects will be disclosed in the course of the following specification, reference being had to the accompanying drawings, in which—

Figure 1:
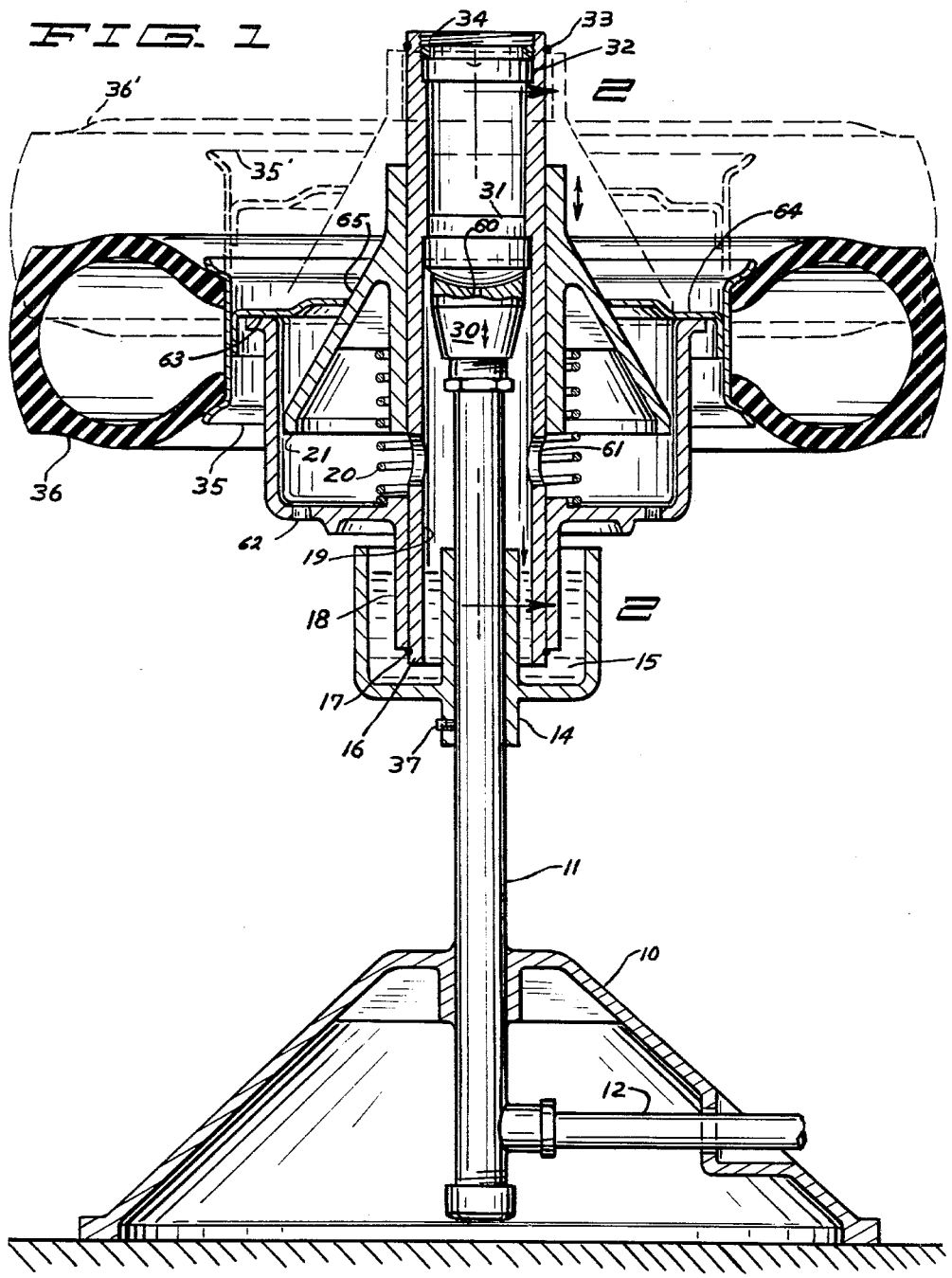
FIG. 1 is a complete side elevation sectional drawing of wheel balancing apparatus of the type wherein a spherical bearing is utilized to support an object to be balanced and a mounting means therefor, in a substantially friction free manner, to which the principles of my invention have been applied.

Referring now to FIG. 1 of the drawing, there is shown a base member 10 which is of substantially conical shape and is adapted to rest on a substantially horizontal surface. At the apex of base member 10 an upright member 11 extends vertically upwardly through base member 10 and is suitably attached thereto by, for example, welding. Upright member 11 has a central axis (not shown) which extends in a substantially vertical direction and normal to the plane of the bottom of base member 10. Upright member 11 is hollow and is provided with a connection to a source of fluid under pressure through a conduit member 12. The lower end of upright member 11 is suitably closed as, for example, by a threaded cap.

A bearing support assembly 30 is shown in position on the top end of upright member 11 and includes at its top end a first spherical bearing surface having in its axial center a suitably sized orifice 60 to admit air or fluid lubricant under pressure to this area. Bearing mounting assembly 30 is adapted for relative axial slidable movement on the top end of upright member 11 as will be discussed in more detail below in connection with FIGS. 2 and 3 of the drawing. Directly above bearing mounting assembly 30 is a second spherical bearing member 31 which is provided with a bearing surface complementary to that described of the first bearing member surface. Second bearing member 31 is mounted within a tube 16 and is held in place by suitable means, for example, press fitting or welding and the like. Tube member 16 is provided with a level indicator 32 which is suitably held in place by screw threaded retaining means 34, at the top end thereof and is mounted so as to provide an indication of a vertical attitude of the axis of tube member 16. The downwardly extending portion of tube member 16 is provided with a plurality of openings 61 through which fluid supplied to the spherical bearing orifice 60 and discharged peripherally between bearing halves 30 and 31 may escape when the apparatus is in operation. Tube member 16 extends downwardly into a hub member 14 which surrounds upright 11 and is suitably fastened in place by, for example, a threaded set screw 37. Hub member 14 is filled with a viscous fluid 15 to provide suitable damping for the movable portion of the wheel balancing apparatus.

A further body hub member 18 is mounted concentrically of and upon the lower end of tube member 16 and is retained in position by suitable retaining member, which may be, for example, a snap ring 17 extending outwardly from the outside lower surface of tube member 16 into a position wherein it will engage the lower end of hub member 18. Hub member 18 has a plurality of openings 62 for the escape of the fluid from the spherical bearing surfaces on members 31 and 40. The top outside periphery of hub member 18 is provided with an annular surface 63 which is adapted to engage a wheel 63 at portion 64 when in position on the apparatus and the surface is coaxial with and normal to the longitudinal axis of tube member 16.

A conical wheel centering member 21, having a downwardly and outwardly flaring surface 65 for engaging the central aperture in a wheel 35 to be balanced, is slidably mounted on the outside and concentric with tube member 16. A stop member 33 extends around the outer periphery of the top end of tube member 16 to prevent wheel centering member 21 from extending upwardly more than a predetermined necessary amount. The outside periphery of the lower part of the downwardly conical flared portion of wheel centering member 21 is adapted to allow wheel centering member 21 to be positioned downwardly and inside of hub body member 18. A helical spring member 20 is positioned intermediate the lower portion of hub body member 18 and the inside of conical wheel centering member 21 to provide an upward biasing force to tend to maintain wheel centering member 21 in its uppermost position as determined by stop member 33 on the upper end of tube member 16. Spring 20 is responsive to the weight of the normal tire and wheel. A wheel 35 having a tire 36 mounted thereon is shown in solid outline in a wheel balancing operative position of the apparatus and in dotted outline, and, as indicated by reference characters 35' and 36' as it is being placed upon the apparatus and before reaching the position required for the balancing measurements and operation.

While a more detailed explanation of the various elements of a wheel balancer may be obtained from the above noted copending application, a brief consideration of the above description of the wheel balancing apparatus shown in FIG. 1 will indicate to one skilled in the art that such a wheel balancer will generally consist of a stationary first spherical bearing which is adapted to receive a like complementary shaped second spherical bearing which forms a support for a wheel assembly mounting means having an axis extending in a vertical direction, a wheel receiving centering means for receiving a wheel so that its central aperture is positioned coaxially of the axis and a wheel engaging surface which is positioned in a plane normal to the vertical axis. The wheel mounting, or holding assembly, is allowed a limited tilting or triaxial degree of freedom of motion by virtue of the spherical bearing surfaces which are provided with a fluid lubricant to reduce the friction therebetween to a nominal value.

Figure 2:
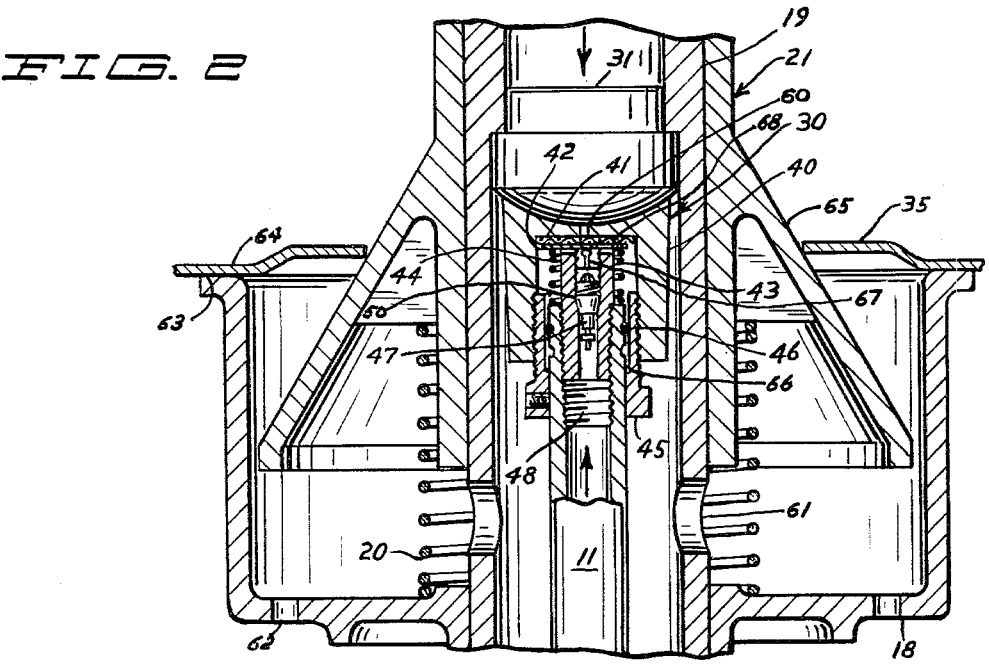
FIG. 2 is an enlarged side elevation sectional drawing of a portion of FIG. 1 showing my invention embodied in the balancing apparatus in a fluid supplying attitude.
Figure 3:
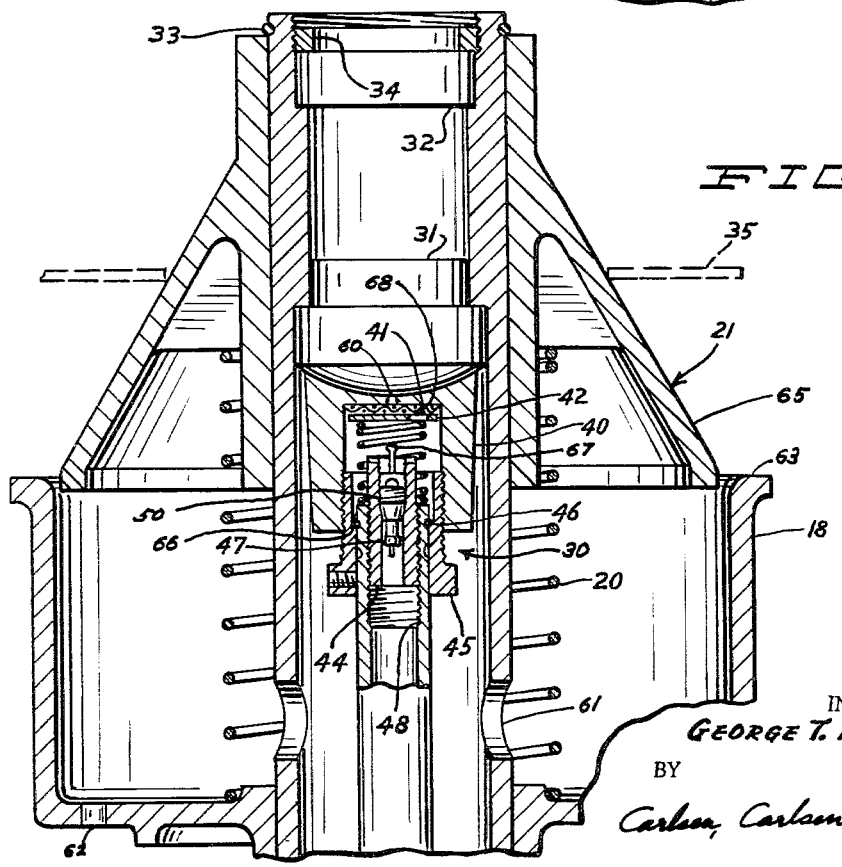
FIG. 3 is a like side elevation sectional drawing showing the illustrated embodiment of my invention in an off position.

Referring now to FIGS. 2 and 3 an enlarged sectional drawing of the center top portion of FIG. 1 illustrates the details of the means for controlling the flow of fluid lubricant through the center of hollow upright member 11 to the surfaces of the first and second bearing members through flow orifice 60. A bearing support member 40 for the first, or lower, bearing surface is shown in position coaxially on the top end of upright member 11. An aperture 60 extends through the central top portion thereof to provide a passageway for the flow of fluid to and between the mating spherical bearing surfaces on the first and second bearing surfaces on members 31 and 40. It should be noted that air or fluid under pressure will disengage the mating bearing surfaces and cause frictionless flotation of the upper bearing on the lower bearing. The inside lower portion of bearing support member 40 is adapted to threadably receive a retaining member 45 which is dimensioned to slide upon the outside periphery of the upper end of upright member 11. A suitable seal member 46, shown in the form of an O-ring, is utilized to provide a sliding seal between the inside of member 45 and the outside of upright member 11 and also serves as a stop member which coacts with a shoulder 66 provided near the midpoint of the inside periphery of member 45 to limit the upward movement of the assembly. It may thus be seen that bearing support member 40 and retaining member 45 are axially slidable upon the top end of upright member 11.

A stop member 44, having internal and external threads, is positioned concentrically inside of upright member 11 which is provided with suitable mating threads therefor and extends upwardly a short distance above the top end of upright 11. One or more grooves extend radially across the top of stop member 44 to provide a fluid passageway as will be explained below in connection with the operation of my invention.

A normally closed valve member 50 which may be, for example, a standard tire valve core is mounted on the inside of stop member 44 and has an upwardly extending actuator pin 67 therefor, which when axially depressed, serves to allow fluid to flow from the inside of upright member 11 upwardly through the valve member. A filter screen 41 and a disc member 42 are positioned immediately below the aperture in the top center portion of bearing support member 40 and helical spring extends between the top of upright member 11 and the lower surface of disc member 42. An eccentrically located aperture 68 is provided in disc member 42 radially displaced from its central axis such that its central portion may engage valve pin 67 to allow fluid to flow to the bearings when normally closed bearing support assembly 30 is depressed and disc 42 engages pin 67 on valve 50 causing it to open.

FIG. 2 shows the wheel balancer under normal operating conditions in which a wheel 35 is in engagement with the wheel engaging surfaces of hub member 18. It will be noted that the actuator for normally closed valve 50 has been engaged by disc member 42 and disc member 42 is in engagement with the top of stop member 44. Fluid may then proceed through the inside of upright member 11, through valve member 50, through the radially extending grooves in the top of stop member 44, through the aperture in disc member 42, the filter screen 41 and the aperture 60 in the top of bearing support member 30 and radially outward between the spherical bearing surfaces on members 31 and 40, to the chamber defined by the inside of tube member 16 and thence through the apertures present in tube member 16 and hub member 18.

The characteristics of spring member 43 determine the minimum predetermined load which will serve to move the fluid supply controlling assembly 30 in a downward direction on the top of upright member 11 to actuate valve member 50 to supply fluid lubricant to the spherical bearing surfaces.

When the wheel assembly is raised, as indicated by the dotted line in FIG. 3, the upwardly directed force exerted by spring member 43 causes movement of assembly 30 in an upward axial direction relative to upright member 11 and valve member 50 will assume its normally closed position to disconnect or turn off the source of fluid lubricant.

It may thus be seen that when a wheel and tire assembly having sufficient weight to overcome the upwardly directed biasing force of spring member 43 is placed on wheel centering member 21, fluid is immediately supplied to the bearing surfaces to prevent damage likely to ensue from direct contact of the first and second bearing members and air is available for balancing. Conversely, when the tire is removed, air flow is interrupted and there is no loss of air during shut down periods during disuse.

It is understood that suitable modifications may be made in the structure as disclosed, provided such modifications come within the spirit and scope of the appended claim. Having now therefore fully illustrated and described my invention, what I claim to be new and desire to protect by Letters Patent is:

For use in combination with apparatus of the class above described, a load responsive fluid lubricant valve and bearing support means, comprising in combination: means for supportingly engaging a bearing member, said means being stationarily mounted within a fluid transmitting mounting therefor; normally closed valve means mounted within said first named means and including an operator therefor which is adapted for engagement upon relative axial displacement of the bearing member with respect to said first named means; and fluid sealing means slidably mounted on the outside of said mounting means and in fluid sealing engagement with said bearing member whereby an axially directed load on said bearing member provides operation of said valve means to a fluid transmitting open position to lubricate said bearing.

References Cited by the Examiner
UNITED STATES PATENTS

| | | | |
|---|---|---|---|
| 2,350,077 | 5/1944 | Smith | 73—484 |
| 2,771,948 | 11/1956 | Thumim | 308—5 |
| 2,898,764 | 8/1959 | Kinsey | 73—483 |
| 2,976,087 | 3/1961 | Cherubim | 308—9 |
| 3,042,460 | 7/1962 | Gilbert | 308—9 |

RICHARD C. QUEISSER, *Primary Examiner.*

JAMES J. GILL, *Examiner.*